United States Patent Office 3,734,902
Patented May 22, 1973

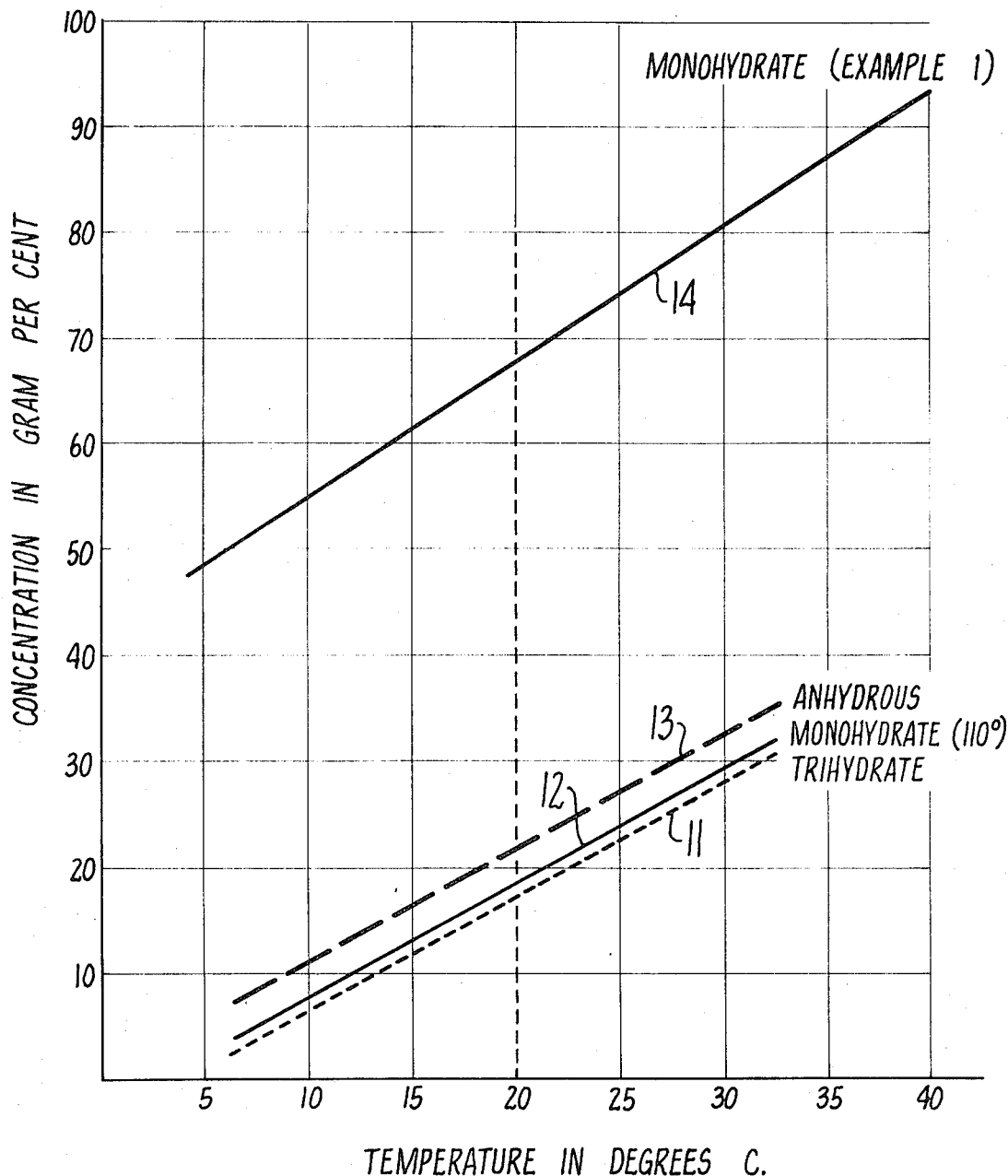

3,734,902
HIGHLY SOLUBLE GLUCOSIDE COMPOSITIONS AND METHOD OF PREPARING SAME
Andrew McNaughton, P.O. Box 778, Mill Valley, Calif. 94941; and Ernst T. Krebs, 1348 S. Van Ness Ave. 94109; and Charles Gurchot, 150 Palo Alto Ave. 94114, both of San Francisco, Calif.
Filed Nov. 26, 1969, Ser. No. 880,185
Int. Cl. C07c 47/18
U.S. Cl. 260—210 R                                    6 Claims

ABSTRACT OF THE DISCLOSURE

A method of preparing a highly water soluble, but unstable form of glucoside compositions which comprises the steps of forming an aqueous solution of said composition, lowering the temperature and pressure to freeze said solution, and removing the water by sublimation whereby highly soluble crystals of said material are formed; and the compositions prepared by said method, particularly amygdalin monohydrate; said compositions having high water solubility in the ambient to blood temperature ranges whereby highly concentrated forms may be injected intravenously or intramuscularly for experimental or therapeutic purposes.

BACKGROUND OF THE INVENTION

The present invention relates to highly soluble glucoside compositions and method of preparing same, and particularly relates to an unstable form of a highly soluble glucoside composition which is soluble for a period of time, long enough to provide a highly concentrated solution for injection intravenously or the like.

It is well known that certain glucoside compositions are and have been utilized experimentally and/or therapeutically in both animals and human beings. It is also well known that parenteral administration is often advantageous and desired in certain applications.

For example, certain mandelonitrile glucosides or glucosido-glucosides have been utilized experimentally as a palliative in the treatment of certain cancers, and amygdalin, in particular, has been so utilized. Other glucosides, such as phloridzin, have been used experimentally to produce glycosuria in animals and was formerly used as an antimalarial therapeutically. Typically, glucosides are soluble in water, and generally very soluble in boiling water. However solubility in water at temperatures ranging from ambient to blood temperatures, such as are utilized for injections, are limited, and it is often necessary to inject a rather large volume of solution in order to provide a desired dose. Large dosages are sometimes utilized in experimentation, and it has also been found that relatively large doses of amygdalin are required for the desired palliative effects in the treatment of cancer.

SUMMARY OF THE INVENTION

It has now been found that certain glucosides can be prepared in an unstable form, which is very highly soluble in water, and which has sufficient stability to be utilized for injections. It has also been found that certain of these glucosides can be retained in the unstable state by storing them in solid form in an anhydrous atmosphere. For example; the composition can be stored in solid form in a moisture proof vial.

Accordingly, it is the primary object of the present invention to provide highly soluble forms of glucoside compositions, and to provide a method of preparing same.

Another object of the invention is to provide a method for retaining relatively unstable highly soluble forms of glucoside compounds in a highly soluble and unstable condition for a period of time prior to use.

It has now been found that these objects are achieved by lyophylizing solutions of the compositions. Stability is retained, in many instances, simply by containning the lyophylized composition in a water impervious vial to retain the material in dry form. It has also been found that the unstable form appears following the rapid freezing step, and lyophylizing is not essential, but preferred in order to remove the water of solution.

The present invention is particularly applicable to amygdalin (D-mandelonitrile-B-D-glucosido-6-B-D-glucoside), which normally occurs as a trihydrate that has a solubility of about one gram in twelve grams of water (see Merck Index, 8th ed. 1968, p. 76). We have found that amygdalin occurs in various forms, including the anhydrous form and a monohydrate which have solubility curves similar to the stable trihydrate. In addition, we have found that the lyophylized form is a monohydrate having a solubility of the order of about seven to eight times the solubility of the other forms, and exhibits other different physical properties. All of the forms except the trihydrate tend to pick up water and change to the stable trihydrate form. However, it has been found that the lyophylized monohydrate does not change to the less soluble form of monohydrate, with each of these monohydrates remaining in their unstable form in the absence of water, but changing to the trihydrate when water is available, either from the atmosphere or from solution.

It has also been found that the lyophylized monohydrate will remain stable in solution for about three days, i.e. evidence of change to the trihydrate does not occur on standing at room temperature until about three days. Accordingly, the unstable form may be stored in a dry state for months or possibly years, and a solution prepared within three days of expected use. Preferably, accurately determined quantities are stored in moisture-impervious vials and retained in this form until it is desired to inject a solution. At that time water is added to the material in the vial in a quantity sufficient to dissolve the entire amount. The total amount of solution (or a part) is then taken up by a hypodermic needle and administered.

Since the solubility of amygdalin is determined for the most part by the glucoside moiety, it was believed this property was common to glucosides in general. Subsequent experimentation has confirmed this belief. For example, phloridzin (phloretin-2'-B-glucoside) also spelled phlorizin and phlorrhizin has been found to change to an unstable form when lyophylized in a manner similar to that described for amygdalin. The unstable form thus obtained also has an increased solubility of about 30 fold. However, it is considerably less stable than the very soluble amygdalin, and evidence of change appears after about 15 minutes when a saturated solution of the unstable form is allowed to stand at room temperature.

Other glucoside compositions which have similar use as amygdalin and which can be prepared in a more highly soluble form include prulaurasin and sanbunigrin (also known as sambunigrin). In addition, other glucosides having different uses are applicable in addition to the phloridzin composition disclosed herein.

Toxicity studies of amygdalin on rats, dogs, mice and rabbits indicate that doses far in excess of any likely to be used for therapy are not toxic; the toleration level being about 3,000 mg./kg. of body weight for intravenous and intramuscular administration. The oral toxicity is of the order of about 40 times the toxicity when given intravenously, i.e. the dose level would be one-fortieth as much.

It has been found that desirable dose levels for human treatment are of the order of 1000 mg. or more, and considerably higher doses are given to animals during experimentation. In its regular stable form amygdalin, one gram (1000 mg.) dissolves in 12 ml. water (see Merck Index, supra). The large volumes of solution render the administration of the higher doses difficult and more painful to receive than smaller volumes. When the unstable form of amygdalin is used, the volume is reduced to practical levels, because of an increased solubility of the order of about 7 to 8 for amygdalin. It is therefore still another object of the invention to provide a highly soluble unstable form of glucosides which are more easily administered intravenously or intramuscularly.

Further objects and advantages of the invention will become apparent as the specification progresses, and the new and useful features of the highly soluble glucoside compositions and method of preparing same will be more fully defined in the claims attached hereto.

BRIEF DESCRIPTION OF THE DRAWING

A preferred form of the invention is illustrated in the accompanying drawing forming a part of this specification in which:

The single figure shows a graph illustrating the solubility of various forms of amygdalin including the form prepared in accordance with this invention.

While only the preferred form of the invention is illustrated in the drawing and the preferred forms illustrated in the examples given below, it should be understood that the various changes or modifications may be made within the scope of the claims attached hereto without departing from the spirit of the invention.

DESCRIPTION OF THE PREFERRED EMBODIMENTS

Mandelonitrile glucosides are well known in the literature, and such compounds may be a monoglucoside or a diglucoside. The monoglucoside exists in the D-form, the D-L form (which is known as prulaurasin), and the L form (which is known as sanbunigrin). However, the diglucoside known as amygdalin is the most readily available and is thereby preferred for therapeutic use. The recovery and general properties of amygdalin are well known in the literature, and need not be described here, except as for background to illustrate the novel form covered by this invention.

In its usual stable form, amygdalin occurs as a crystalline trihydrate having a melting point of 200° C., with a crystalline structure being orthorhombic. The anhydrous form is also known, and it has a melting point of about 220° C. In the Merck Index, another form is reported which has melting points in the range 125° C. to 130° C., and this substance is reported as the once melted and then solidified amygdalin. It is rather difficult to tell what this substance is, but it is believed quite possible that it is the mixture of various crystal forms. For example, another form of amygdalin has been found simply by heating the amygdalin crystals to drive off water and provide a monohydrate. This monohydrate has a melting point of 219° C.

All of these three forms of amygdalin have a substantially similar solubility as best seen in the drawing. As there shown, the amygdalin trihydrate has the temperature solubility curve indicated in the line 11. The anhydrous form has a slightly higher solubility, and the solubility curve of the anhydrous form is shown in the line 12. The monohydrate formed by simply heating the material has an intermediate solubility, and this curve is shown at 13 in the drawing.

As explained above, these solubilities are sufficiently low that comparatively large volumes of aqueous solutions are required in order to administer large dosages. However, such large dosages are required for certain experimental and therapeutic use. Ordinarily one is forced to utilize the drug available at the solubility which exists. However, we found another form of amygdalin which is also a monohydrate, but which has the solubility considerably higher that the other three forms; this solubility being shown in the drawing in line 14. This more soluble monohydrate differs from the other monohydrate in that it has a melting point of 113° C., crystallizes in the isometric system, and exhibits no birefringence, while the other monohydrate crystallizes in the monoclinic system and exhibits low birefringence. Accordingly, it is seen that this is clearly another form of amygdalin, and that it has the high solubility desired for advantageous experimental and therapeutic use.

Preferred method of preparing the highly soluble monohydrate is given in Example 1 below.

Example 1

The stable form of amygdalin trihydrate is dissolved in water at a temperature of about 40° C. Celsius to provide a concentrated solution. The amount of solution utilized may vary and will be selected according to the freeze-dry equipment available in the later steps. The saturated solution is then placed in a freeze-drying unit where it is rapidly frozen to −45° to −50° F. while applying a vacuum of the order of say 5 microns. The vacuum system (pump) is kept on while heat is provided to the system to provide a temperature external to the solution of about 85° F. and the vacuum is maintained in the range of 5 to 100 microns throughout the drying step. At the end of the operation, which lasts approximately 48 hours, the vacuum again lowers to about 5 microns as in the beginning of the operation but with heat applied.

It will be appreciated, that the application of vacuum produces a very rapid freezing of this solution, because part of the water solution quickly evaporates under vacuum conditions, thereby removing heat from the solution. In this way the vaccum tends to lower and maintain the solution medium at a temperature somewhat close to the boiling point of the water at the pressure present. At such high vacuum it will be appreciated that the solution is rapidly cooled and maintained at a low temperature.

After the lyophylization described above, the amygdalin is found to be a monohydrate, having the high solubility as shown in line 14 of the drawing. Specifically, the compound is colorless and crystallizes in the isometric system. It has therefore no birefringence since it is optically homogeneous or isotropic, and it has a single refractive index of 1.544. The crystal form is not readily discernible, but appears to be octahedral or cubic or combinations of both. The most striking physical differences is the high solubility, specifically a solubility of 58 grams per 100 ml. of solution at 10° C.

Since the trihydrate has the solubility of 8.3 gm. at this temperature, the increased solubility is considerable. It will be appreciated that the amount of volume of solution required to administer 1 gram is in the order of 2 ccs. or less depending on the temperature of the solution. Accordingly, this material provides a tremendously improved form of injections. The amygdalin thus prepared has a strong affinity for water and reverts to the trihydrate when water is available and the temperature is less than about 90° C. However, the reversion is rather slow and even a water solution of the very soluble monohydrate remains stable for several days before crystals of the less soluble trihydrate separate from the solution.

Example 1–A

In order to determine the nature of the form of amygdalin of Example 1, and the mechanism whereby the highly soluble form is provided, amygdalin trihydrate was heated in order to drive off water and obtain forms of lesser hydration. Utilizing this procedure, the anhydrous form was prepared by heating the trihydrate to 120° C. However, when amygdalin trihydrate was heated at 110° C. in a constant temperature oven a monohydrate was formed. Upon further effort it was learned that this monohydrate is formed when the heating is at a temperature between 90° C. and 110° C., but at 90° C. or below the trihydrate is stable. The monohydrate prepared by heating in the 110° C. oven is that designated in the drawing by solubility line 13, and will be identified herein as amygdalin-110 whereas the more soluble lyophilized monohydrate (see Example 1) will be identified as amygdalin-lyo.

The four amygdalin forms had their solubilities determined at various temperatures, by preparing a saturated solution of each of the materials at the temperature measured, evaporating the solution to dryness, and weighing the dry amygdalin residue. In order to maintain the proper hydration during drying, the anhydrous amygdalin sample was dried at 120° C., the two monohydrates were dried at 110° C., and the trihydrate was evaporated at 90° C. The optical examinations of all amygdalins were made in cedarwood oil in which they are all insoluble. This was done to avoid crystal changes that occur when the unstable anhydrous and monohydrate amygdalins revert to the trihydrate in the water. This reversion also occurs in other solvents and in air, because the small amounts of water available are taken up by the unstable forms. However, the form of monohydrate of Example 1 undergoes very slow changes in water. Melting points were taken in the usual way, and the data determined are given in Table 1 below.

ing, and that the freeze-drying is only desirable to provide a purified dry form. Accordingly, a solution was prepared from 12.5 grams of amygdalin trihydrate and enough water to provide 100 ml. of solution. This solution was then rapidly cooled so that it reached the frozen condition without any noticeable precipitation. After freezing, the solution was heated just above the melting point of water to melt any ice that might be present. Two distinct forms of amygdalin crystals were found, and these crystal forms indicated the presence of the amygdalin monohydrate form in Example 1 above, and the amygdalin trihydrate present at the beginning. Accordingly, it is believed that the highly soluble form of amygdalin prepared by this invention is also obtainable by low temperature crystallization.

Example 3

Amygdalin crystals prepared in accordance with the procedure of Example 1 were carefully made and placed in moisture impervious vials. These vials were maintained in storage for periods in excess of three months, and then used. At the time of use, the amygdalin was highly soluble and had remained in the vials unchanged. Apparently, the highly soluble amygdalin monohydrate reverts back to the trihydrate form only and does not change to the monoclinic monohydrate which is not highly soluble. Accordingly, storage in the absence of water is sufficient to maintain the unstable form for considerable lengths of time.

TABLE 1

| | Comparative solubilities in gram percent | | | | | | | |
|---|---|---|---|---|---|---|---|---|
| Temperatures, ° C | 7.0 | 10.0 | 20.0 | 21.6 | 25.0 | 29.5 | 30.0 | 32.5 | 39.0 |
| Anhydrous amygdalin | | 10.93 | | | | 32.13 | | | |
| Amygdalin-lyo monohydrate of Example 1 | 53.53 | | | 73.51 | | | | | 92.60 |
| Amygdalin-110 monohydrate | 5.22 | | 16.83 | | | | 31.10 | | |
| Amygdalin trihydrate | 8.3 | | | | 23.15 | | | 31.52 | |

| | Other properties | | |
|---|---|---|---|
| | Melting point, ° C. | Refractive index | Crystal system |
| Anhydrous amygdaling | 224 | 1.515 | Undetermined (anisotropic). |
| Amygdalin-lyo monohydrate of Example 1 | 113 | 1.544 | Isometric—no birefrigence. |
| Amygdalin-110 monohydrate | 219 | 1.540 | Monocliniclow birefringence. |
| Amygdalin trihydrate | 200 | 1.532 | Orthorhombic med. birefr. |

As indicated above, the advantage of lyophylized amygdalin over that of amygdalin trihydrate is important for the parenteral administration of the glucoside in medical and veterinary practice because it is often necessary to use very large doses of amygdalin. Such doses can be of the order of 150 mg. per kilo in man, and even more in animals, dissolved in water and injected intravenously or intramuscularly. The greater solubility of the amygdalin prepared according to the invention permits using small volumes of medication.

Amygdalin is sufficiently non-toxic to permit the slow injection of concentrated solutions intravenously without producing appreciable untoward effects. Moreover the rate of transformation of the amygdalin monohydrate of Example 1 to the trihydrate is slow enough to permit slow instillation into the blood stream with no risk whatever of precipitation or crystallization in the blood of the less soluble and more stable amygdalin trihydrate. This is illustrated by the time required for a water solution of amygdalin-lyo to be transformed to the trihydrate. If a 30% water solution of amygdalin-lyo is allowed to stand at room temperature orthorhombic crystal nuclei of the trihydrate, visible with a 100× microscope, appear in the solution after not less than five days. In a colloidal medium like blood the transformation can be expected to be slower.

Example 2

It has been suggested that the change to the highly soluble monohydrate occurs because of the quick freez- As explained above, amygdalin is a diglucoside, and specifically a diglucoside of mandelonitrile. However, it was believed that the highly soluble crystal form prepared by low temperature freezing was due to the glucoside moiety, and that monoglucosides would also be operative in accordance with the invention. In order to prove out this theory, phloridzin was lyophylized as explained in Example 4 below.

Example 4

The procedure of Example 1 was repeated except that a solution of 0.1 gm. of phloridzin dissolved in sufficient water to make 100 ml. of solution was used. After lyophylization, the solubility of the phloridzin was checked and it was found that the solubility had increased so that the 0.1 gm. of phloridzin treated dissolved in approximately 3 ml. of water. Accordingly, it is seen that a different form was obtained, and, in this case, the solubility increase was approximately 30 fold. Both of these forms of phloridzin are dihydrates. The lyophylized preparation is unstable, and after redissolving in 3 ml. water, the phloridzin started crystallizing out after about 15 minutes. Soon thereafter all the phloridzin reverted to the original dihydrate.

This property would be very useful in the establishment of large slowly soluble depots in experimental animals. In other words, the highly solubilized form can be injected in the animal intramuscularly, and then in a short time solutions will form crystals that may be observed. In order to determine whether the temporary increase in solubility is due to supersaturation or not, various experiments were made to try to supersaturate the stable phloridzin dihydrate. It was not only impossible to obtain a highly supersaturated solution, but none of the usual methods for providing supersaturated solutions were successful in obtaining any supersaturation at all. In addition, phloridizin is listed only as having a solubility of about 1.0 gram per liter, and the dihydrate is reported as the usual form (see Merk Index, supra), and no mention is made of any tendency of the material to form supersaturated solution.

Experiment 4–B

The dihydrate of phloridzin is heated to 170° C. until constant weight is obtained. In this way, water is driven off and the anhydrous compound is formed. Anhydrous phloridzin is found to be nearly insoluble in water. Under observation with a microscope, it appears that the anhydrous form first hydrates to a dihydric form and then disssolves. Accordingly, the greatly increased solubility of the lyophylized pholridzin appears to be due to a different allotropic form as was demonstrated with amygdalin.

From the above description, it is seen that we have provided highly soluble glucoside compositions and a method of preparing the same. It is also seen that these highly soluble compositions are particularly advantageous for the parenteral administration of glucosides in connection with experimental and therapeutic use.

We claim:
1. A method of preparing a highly soluble unstable form of a hydrated mandelonitrile glucoside which comprises the steps of
   dissolving the stable form of a hydrated mandelonitrile glucoside in sufficient water to prepare an aqueous solution thereof,
   rapidly freezing the solution to render the entire composition in a solid state, and
   removing the water by sublimation whereby a highly soluble unstable form of the mandelonitrile glucoside is obtained.

2. A method of preparing a highly soluble unstable form of a hydrated mandelonitrile glucoside as defined in claim 1, in which the pressure of the atmosphere in which the frozen mixture sublimes is maintained below 100 microns of mercury.

3. A method of preparing a highly soluble unstable form of a hydrated mandelonitrile glucoside as defined in claim 2, in which the temperature of the frozen solution is reduced to below about −40° F.

4. A method of preparing a highly soluble form of a mandelonitrile glucoside as defined in claim 1, in which the glucoside is amygdalin.

5. A method of preparing a highly soluble for of a mandelonitrile glucoside as defined in claim 1, in which the glucoside is phloridzin.

6. A highly water soluble unstable form of a mandelonitrile glucoside formed by freezing an aqueous solution of the stable form and removing the water of solution by sublimation at reduced pressure.

References Cited
UNITED STATES PATENTS 3,321,419    5/1967    Kennedy _____ 260—210 R
3,546,205    12/1970   Hotta et al. _____ 260—210 R LEWIS GOTTS, Primary Examiner J. R. BROWN, Assistant Examiner U.S. Cl. X.R.
424—180